United States Patent
Ji et al.

(10) Patent No.: US 8,600,242 B2
(45) Date of Patent: Dec. 3, 2013

(54) POWER OPTIMIZATION OF OPTICAL RECEIVERS

(75) Inventors: Philip N. Ji, Princeton, NJ (US); Yoshiaki Aono, Chiba (JP); Kouichi Suzuki, Chiba (JP); Ezra Ip, Plainsboro, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 448 days.

(21) Appl. No.: 13/078,559

(22) Filed: Apr. 1, 2011

(65) Prior Publication Data
US 2011/0249969 A1 Oct. 13, 2011

Related U.S. Application Data

(60) Provisional application No. 61/322,390, filed on Apr. 9, 2010.

(51) Int. Cl.
*H04B 10/63* (2013.01)
(52) U.S. Cl.
USPC ............................... 398/203; 398/210
(58) Field of Classification Search
USPC ..................................... 398/203, 210
See application file for complete search history.

(56) References Cited

U.S. PATENT DOCUMENTS

| 6,043,915 | A | 3/2000 | Giles |
| 2009/0232497 | A1 | 9/2009 | Archambault |
| 2010/0129082 | A1 | 5/2010 | Zhong |
| 2011/0033182 | A1 | 2/2011 | Haunstein |
| 2011/0058820 | A1 | 3/2011 | Ooi |

FOREIGN PATENT DOCUMENTS

WO     0156196 A1     8/2001

OTHER PUBLICATIONS

Nelson, L., et al. "Real-Time Detection of a 40 GBPS Intradyne Channel in the Presence of Multiple Received WDM Channels" OSA/OFC/NFOEC 2010. Mar. 2010. (3 Pages).

*Primary Examiner* — Shi K Li
(74) *Attorney, Agent, or Firm* — Joseph Kolodka

(57) ABSTRACT

An optical receiver system is disclosed. The system includes a local oscillator, a mixer and a processor. The local oscillator is configured to generate a laser signal to indicate a selection of one of a plurality of channels. In addition, the mixer is configured to receive signals on the plurality of channels and to utilize the laser signal to distinguish the signal on the selected channel. Further, the processor is configured to maximize a power level difference between the laser signal and at least one of the plurality of channels based on a total number of the plurality of channels by adjusting the power of the laser signal input to the mixer to limit a noise penalty in the receiver system.

20 Claims, 5 Drawing Sheets

US 8,600,242 B2

POWER OPTIMIZATION OF OPTICAL RECEIVERS

RELATED APPLICATION INFORMATION

This application claims priority to provisional application Ser. No. 61/322,390 filed on Apr. 9, 2010, incorporated herein by reference.

This application is also related to commonly owned, co-pending utility application Ser. No. 12/900,200 filed on Oct. 17, 2010 and commonly owned provisional application Ser. No. 61/250,185 filed on Oct. 9, 2009, each of which is incorporated herein by reference.

BACKGROUND

1. Technical Field

The present invention relates to optical receiver systems and methods of operation and, in particular, to methods and systems for managing the optical power of signals in such receivers.

2. Description of the Related Art

A reconfigurable optical add/drop multiplexer (ROADM) node is an important optical network element that permits flexible adding and dropping of signals on any or all wavelength division multiplexing (WDM) channels at the wavelength layer. A multi-degree ROADM node (MD-ROADM), which can be a ROADM node with 3 degrees or higher, is another optical network element that also provides a cross-connection function of WDM signals among different paths. Although conventional ROADM nodes have a certain degree of flexibility for adding and dropping signals on WDM channels, they do not possess sufficient flexibility to adapt to rapidly growing and increasingly dynamic Internet-based traffic. For example, transponders employed by conventional ROADM nodes typically do not have non-blocking and wavelength transparent access to all dense wavelength division multiplexing (DWDM) network ports. As a result, colorless and directionless (CL&DL) MD-ROADM nodes have been widely studied recently to replace conventional ROADM nodes. In this context, "colorless" can refer to an ROADM node feature by which each transponder can receive and transmit signals on any wavelength employed by the ROADM node system. In turn, "directionless" can refer to an ROADM node feature by which each transponder connected to the node can receive signals originating from any input port and can forward signals to any output port of the ROADM node.

SUMMARY

One embodiment is directed to an optical receiver system including a local oscillator, a mixer and a processor. The local oscillator is configured to generate a laser signal to indicate a selection of one of a plurality of channels. In addition, the mixer is configured to receive signals on the plurality of channels and to utilize the laser signal to distinguish the signal on the selected channel. Further, the processor is configured to maximize a power level difference between the laser signal and at least one of the plurality of channels based on a total number of the plurality of channels by adjusting the power of the laser signal input to the mixer to limit a noise penalty in the receiver system.

Another embodiment is directed to an optical signal processing system. The system includes an ROADM node that further includes a selective switch that is configured to select a set of channels from a plurality of channels to drop to a plurality of transponders. The system also includes the plurality of transponders, each of which includes a local oscillator and a mixer of the optical receiver system embodiment described above. In addition, the ROADM node further includes the processor of the optical receiver system embodiment described above.

An alternative embodiment is directed to a method. In accordance with the method, a total number of a plurality of channels on which signals are input into an optical mixer is received. The method further includes determining a maximal power level difference between a laser signal, generated to enable the mixer to distinguish a signal on one of the plurality of channels, and at least one of the plurality of channels based on the total number of the plurality of channels. In addition, the power of the laser signal input to the mixer is adjusted in accordance with the determined maximal power level difference to limit a noise penalty.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
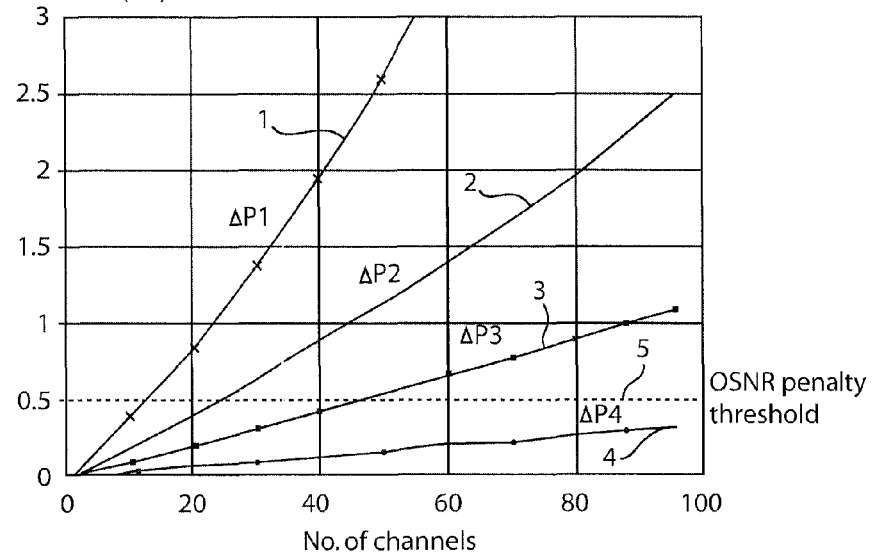
FIG. 1 is a graph illustrating an exemplary relationship between noise penalties, total numbers of dropped channels applied to a coherent receiver and power differences between a local oscillator laser and one or more dropped signals applied to the receiver.

Implementation of colorless and directionless features of an ROADM node renders the conventional static optical demultiplexer unsuitable for separating dropped WDM signals, as the wavelength associated with each transponder used by the ROADM node may be changed dynamically. A "filterless" or "demux-less" colorless and directionless multi-degree ROADM node architecture has been proposed in the commonly owned applications referenced above. Exemplary architectures described therein remove a wavelength selector element, such as an optical demultiplexer or filter, from the receiver system and utilize a local oscillator (LO) to select from the WDM channels in the coherent optical system a target channel to drop. However, due to the existence of the other WDM channels at the transponder, additional interference may arise between the local oscillator and the unwanted signals. Here, the interference may lead to a certain level of performance degradation of the received signal in the form of an optical signal to noise ratio (OSNR) penalty. For the system to be used practically in optical networks, this penalty should be kept within a certain threshold level (for example, 0.5 dB, depending on system specifications) among all conditions. In particular, the OSNR penalty should be considered for all possible WDM channel numbers, as the ROADM node can drop between zero and all channels at different times.

Embodiments described herein can minimize the OSNR penalty in filter-less ROADM nodes and can limit the penalty to be within threshold levels that maintain optimal performance, thereby ensuring stability of the system. The OSNR penalty can be managed based on a theoretical analysis of the ROADM/transponder system that estimates the OSNR penalty under various conditions. In particular, the inventors have discovered that maximizing the power level difference between a local oscillator laser in the coherent receiver and dropped signals has a significant impact in reducing the OSNR penalty. Using results of the analysis with certain configuration information of a coherent receiver, which can be assumed to be fixed, embodiments can establish a feedforward loop. Here, the loop can be configured to gather WDM channel count information, to calculate the power levels of receiver components to limit the OSNR penalty within a particular level for this WDM channel count and to control the powers of the local oscillator and the WDM signals to achieve the calculated power levels at the coherent receiver. Specifically, embodiments can optimize the maximization of the power level difference between the local oscillator and the WDM signals based on the saturation level of photodetectors, shot noise, thermal noise and quantization noise of a downstream digitizer. Accordingly, embodiments of the present principles can ensure that the system operates with an optimum configuration at all times, regardless of the number of WDM channels with which the receiver contends to perform a drop function.

In an ROADM node without wavelength selectors, such as optical demultiplexer or tunable filters, all the dropped signals may reach each transponder in the transponder system. Such an ROADM node is referred to herein as a "filter-less" ROADM node. As stated above, examples of filter-less ROADM nodes are described in the above-referenced commonly owned applications. Even though the local oscillator (LO) in the coherent receiver of the filter-less ROADM can detect the correct channel(s) to drop, the coherent receiver suffers from interference due to the other received WDM channels. The performance of the system can be estimated based on the signal to interference and noise ratio (SINR) parameter, where the noise includes LO-amplified spontaneous emission (ASE) beat noise, shot noise and thermal noise. The SINR, and the OSNR penalty mentioned above, is dependent on the number of WDM channels received, the power levels of the received signals and the local oscillator and the quality of the coherent receiver. In particular, the SINR can be expressed as:

$$SINR = \frac{S}{N+I} = \frac{S}{N_{LO-ASE} + N_{Shot} + N_{Therm} + I_{Sig-Sig}} = \frac{P_{LO} P_{Sig,k}}{P_{LO} P_{ASE} + \alpha\left(P_{LO} + \sum_{i=1}^{n} P_{Sig,i}\right) + \beta N_{Rx} + \gamma CMRR \sum_{i=1}^{n} P_{Sig,i}^2}$$

where S is the total signal power, N denotes the noise, I denotes the interference, $N_{LO-ASE}$ is the LO-ASE beat noise, $N_{Shot}$ is the shot noise, $N_{Therm}$ is the thermal noise, $I_{Sig-Sig}$ is the signal-signal interference term, $P_{LO}$ is the optical power of LO, $P_{Sig,k}$ is the power of the optical signal of a targeted channel (referred to herein as 'Channel k'), $P_{ASE}$ is the power of the ASE noise, α is related to the receiver design, $P_{Sig,i}$ is the power of the ith channel among the total of n WDM channels entering the receiver, β is the coupling loss term, $N_{Rx}$ is the receiver noise, γ is a constant related to the receiver, and CMRR is the common mode rejection ratio of the receiver.

A more comprehensive model is as follows:

$$SINR = \frac{\langle S^2 \rangle}{\langle I^2 \rangle + \langle N^2 \rangle} = \frac{P_{LO,q} P_{ch,q}}{P_{LO,q} P_{n,q} + \frac{1}{2}\left(\frac{R_+ - R_-}{R_+ + R_-}\right)^2 \left(\frac{R_s}{f_{sp}}\right) N_{ch} P_{ch,q}^2 + \frac{q}{R_+ + R_-}(P_{LO,q} + N_{ch} P_{ch,q}) R_s + \frac{2}{(R_+ + R_-)^2}\left(\frac{2kT_{amp}}{R_L} R_s + \frac{\Delta^2}{3R_L^2} 4^{B-ENOB}\right)}$$

where $P_{LO,q}$ is the power of local oscillator in a given quadrature (q) of a polarization-and-phase diversity receiver, $P_{ch,q}$ is the power of each input channel (ch) in the given quadrature q, $R_+$ is the responsivity of the photodetector to which the input WDM channels are applied, $R_-$ is the responsivity of the photodetector to which the local oscillator signal is applied, $R_s$ is the bandwidth of the targeted signal on channel k, $f_{sp}$ is the channel spacing, $N_{ch}$ is the total number of WDM channels input to the optical receiver, q is the electronic charge in the photodetectors, k is Boltzmann's constant, $T_{amp}$ is the effective temperature of a trans-impedance amplifier (TIA) in the optical receiver, $R_L$ is the trans-impedance load in the TIA and ENOB is the effective number of bits for a B-bit signal at a target dynamic range of a digitizer. It should be noted that examples of α and γ are included in the comprehensive model.

Compared to a conventional method of filtering out the target channel before or at the coherent receiver where SNR (signal to noise ratio) is considered, the above-referenced equation for the "filter-less" system has an additional signal-signal interference term $I_{Sig-Sig}$. As indicated above, the interference term $I_{Sig-Sig}$ is determined by the CMRR of the receiver and the total amount of signal power. Because the power of each WDM channel is usually at similar levels, the interference is determined by (a) the power difference between the LO and each channel signal; (b) the number of WDM channels applied to the receiver; and (c) the CMRR of the receiver.

Referring now in detail to the figures in which like numerals represent the same or similar elements and initially to FIG. 1, a graph of the OSNR penalty at $1\times10^{-3}$ BER (bit error rate) versus the number of channels at four settings of the power difference between the LO and each channel signal (ΔP) is illustrated. In this example, ΔP1<ΔP2<ΔP3<ΔP4. The CMRR of the receiver is assumed to remain constant. In accordance with FIG. 1, curves 1-4 respectively correspond to ΔP1-ΔP4. It should be noted that, although the power of each WDM channel input to the coherent receiver is assumed to be equal or nearly equal, other embodiments may implement channels that have different power levels. As such, ΔP can indicate the average power difference between the channels input to the coherent receiver and the LO. Alternatively, the power difference ΔP can be the power difference between the power of the LO signal and the sum of the powers of the channels input to the coherent receiver.

As illustrated in FIG. 1, the inventors have discovered that, with a fixed ΔP, the OSNR penalty increases as the total number of channels input to the receiver increases. In turn, the OSNR penalty increases as ΔP decreases for any particular total number of channels input to the receiver. When the total number of channels input to the receiver increases beyond a certain number, or if the power difference between the LO and a received signal decreases below a certain level, the OSNR penalty will exceed an OSNR penalty threshold 5, such as the 0.5 dB mentioned above, for the system. Accordingly, based on these results, the ROADM/transponder system should optimize its performance by setting ΔP as high as possible.

One way to increase ΔP is to maximize the LO power. However, this is not always beneficial, as the photodetectors (PDs) in the coherent receiver have certain input power limits. For example, if the input optical power (i.e. the sum of LO power and the signal powers, minus any loss at the receiver) exceeds such limits, the PDs will be saturated and cannot provide the correct O/E (optoelectronic) conversion output. Indeed, exceeding these power limits may even damage the PDs. Furthermore, exceedingly high power at the LO will also introduce excessive power consumption, which in itself is undesirable.

Another way to increase ΔP is to reduce the signal power. However, reducing the signal power has its own limits. For example, the results provided in FIG. 1 do not consider the shot noise and thermal noise, as they are much smaller than the LO-ASE beat noise and the signal-signal interference. However, if the signal power is relatively low, such noise will become more significant and will hamper the quality of the output signals of the receiver. Also, the results of FIG. 1 do not take into account the quantization noise of the digitizer that processes the receiver's output. In a practical scenario, the digitizer has limited bandwidth, a limited dynamic range and a finite ENOB (effective number of bits). Thus, a very low signal power will result in a large error during the quantization process. Therefore, the signal power should be kept above a lower limit.

Due to these factors, embodiments can consider at least 3 criteria simultaneously to optimize the receiver system: a) the power difference between the LO and one or more received signals should be as high as possible; b) the input optical power at the receiver should fall below the saturation limit of the receiver; and c) the output optical power level should be sufficiently high to account for the quantization error and error due to shot noise.

Figure 2:
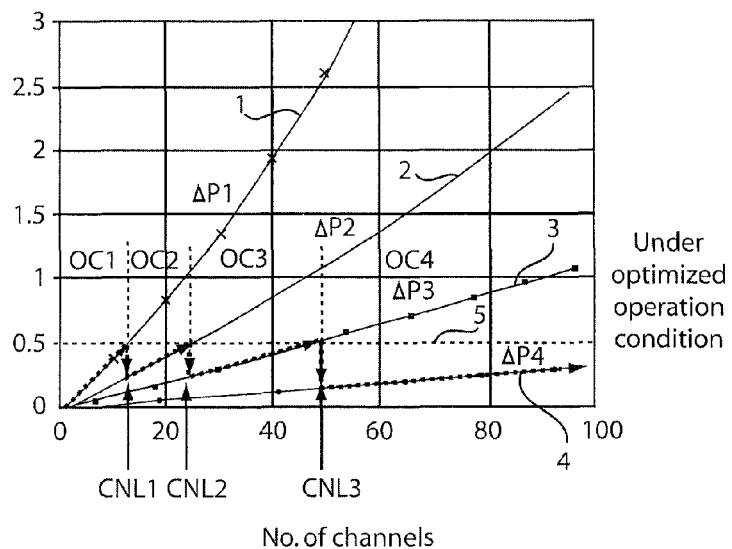
FIG. 2 is a graph indicating exemplary optimal operating conditions for a coherent receiver.

With reference now to FIG. 2, a simple example of an optimization scheme based on the three criteria provided above is described. Assuming fixed receiver characteristics, the ROADM/transponder system can be configured to apply the operation condition 1 (OC1) if the total number of WDM channels applied to the coherent receiver is low. In particular, the ROADM/transponder system can set both the LO power and signal powers to ΔP1 corresponding to OC1. If the total number of channels increases beyond some channel limit, denoted as "Channel number limit 1" (CNL1) in FIG. 2, such that the OSNR penalty is at or exceeds the OSNR penalty threshold 5, the ROADM/transponder system can apply the operation condition 2 (OC2) by setting the LO power and signal powers to ΔP2. In turn, if the total number of channels applied to the coherent receiver increases further beyond "Channel number limit 2" (CNL2) in FIG. 2, then the ROADM/transponder system can change the operation condition to OC3 on the plot. Here, the ROADM/transponder system sets the LO power and signal powers to ΔP3. Similarly, the ROADM node/transponder system sets the LO power and signal powers to ΔP4 in accordance with OC4 if the total number of channels applied to the coherent receiver increases beyond "Channel number limit 3" (CNL3) in FIG. 2.

It should be noted that if the receiver characteristics should change, then the ROADM/transponder system should change the particular operation conditions it applies. In other words, the operation condition is determined from the system information, such as the characteristics of the coherent optical receiver and the characteristics of a digitizer. Further, the operation condition is also determined from the signal information, such as the total number of WDM channels applied to the coherent receiver and the input power for each channel, using the equation and criteria described above.

Figure 3:
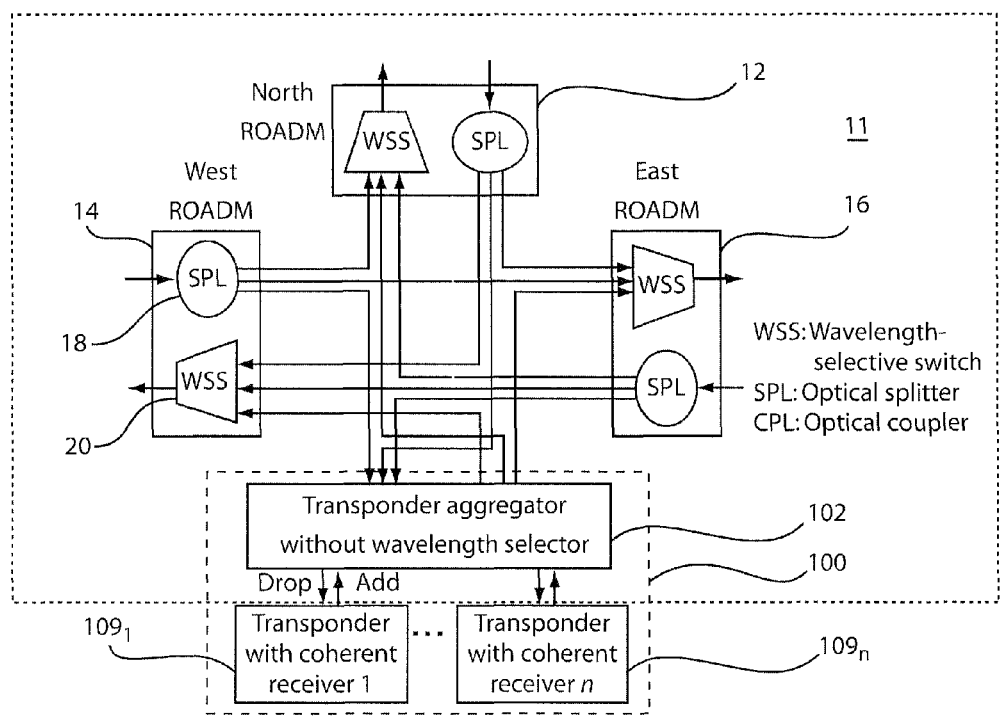
FIG. 3 is a high-level block/flow diagram of an exemplary optical signal processing system including an ROADM node and a set of transponders.

With reference now to FIG. 3, a block/flow diagram of an exemplary embodiment of an optical signal processing system 10 is illustrated. The embodiment is implemented here as an ROADM/transponder system. The ROADM node system 11 is a 3-degree colorless and directionless ROADM node system. As shown in FIG. 3, the system 11 may include three ROADM modules 12, 14 and 16, each of which can include a splitter 18 and a wavelength-selective switch (WSS) 20. The system 10 performs a filter-less drop signal selection at the transponder aggregator 102 and n transponders $109_1$-$109_n$ with coherent receivers. The transponder aggregator 102 in the ROADM node 11 and the transponder aggregators $109_1$-$109_n$ form a system 100 that is referred to herein as a "coherent receiving system," which is filter-less in this embodiment. The power optimization schemes described herein can be applied within the system 100. A description of some of the filterless characteristics of the system 100 are described in detail in the commonly owned applications referenced above.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
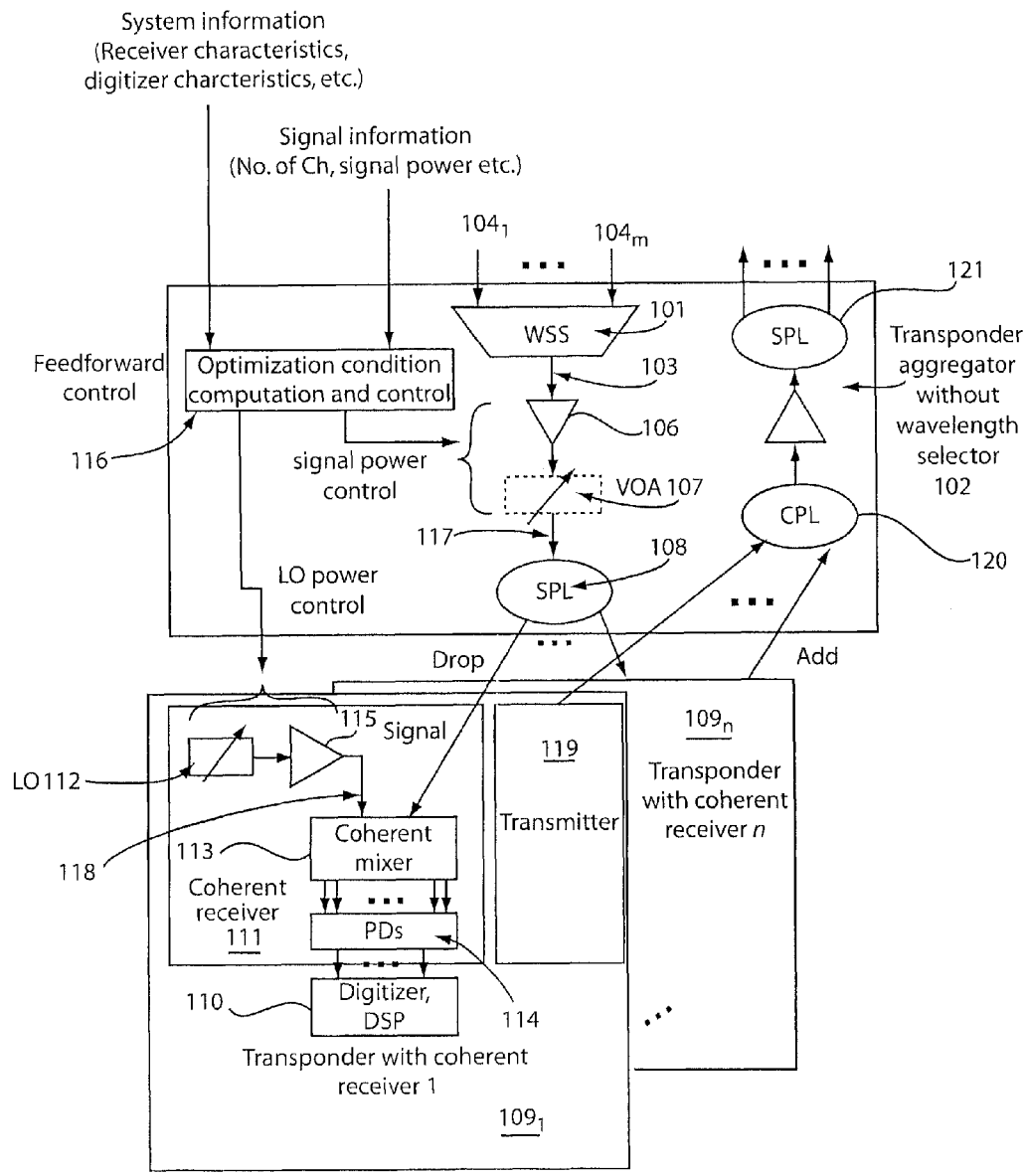
FIG. 4 is a high-level block/flow diagram of an exemplary coherent receiving system.

Referring now to FIG. 4 with continuing reference to FIG. 3, an exemplary embodiment of the coherent receiving system 100 is illustrated. In the system 100, the WSS 101 in the transponder aggregator 102 can select the signals to be dropped locally 103 from all input ports $104_1$ to $104_m$. The optical amplifier 106 amplifies the dropped signals received from the WSS 101. In conjunction with the optical amplifier, an optional variable optical attenuator (VOA) 107 can receive the dropped signals from the amplifier 106 to further adjust the signal power level. Because the signal is usually split for a large number of transponders, the signal power should be relatively low. Thus, the signal VOA 107 may not be necessary. However, in other implementations, the VOA 107 can attenuate the dropped signals. The optical splitter 108 can receive the dropped signals from the amplifier 106 or the VOA 107 and can then split the dropped signals for transmission to all transponders $109_1$-$109_n$. Each transponder includes a coherent receiver 111, which comprises a local oscillator source 112, a coherent mixer 113, and an array of photodetectors 114 configured to convert received optical signals to electrical signals.

The coherent mixer 113 can be a 90-degree optical hybrid. For example, the mixer 113 can be polarization-insensitive coherent mixer or can be a polarization diversity coherent mixer. Here, the mixer 113 can mix the input dropped signals output by the splitter 108 with a continuous wave signal from the local oscillator laser 112. Because the receiver 111 can be employed with a colorless ROADM, the local oscillator laser 112 is tunable. The laser's wavelength is tuned to a single particular WDM channel which has the wavelength of the targeted drop channel. The targeted drop channel is the channel among multiple WDM signals input to the coherent mixer 113 that is intended for the user or client downstream from the corresponding transponder 109 in which the mixer 113 is located. Using the technique, despite the fact that the transponder 109 receives multiple WDM channels from the transponder aggregator 102, only the specific, selected target channel will be received due to the coherent receiving technology. To distinguish the signal on the selected target channel from signals on the other channels input to the mixer 113, the mixer 113 produces different vectorial additions of the LO 112 signal and the targeted drop channel signal. The targeted drop channel signal is then detected by the array of photodiodes 114, converted to an electrical signal and processed thereafter to recover data from the target channel. Thus, the local oscillator 112 can be configured to generate a laser signal to indicate a selection of the targeted drop channel signal from the multiple WDM channels received by the mixer 113. The local oscillator 112 can be tuned by a controller within the ROADM (not shown) to the particular WDM channel to indicate the selection. Alternatively, the processor 116 can be configured to implement the tuning of the oscillator 112 to indicate the selection of the targeted drop channel.

In certain implementations, the coherent mixer 113 and photodetectors 114 can be integrated. If the WDM signals have dual polarization (i.e., is polarization multiplexed), the coherent mixer 113 should have polarization diversity, as indicated above. It should be noted that, although a single end receiver can also be used, a balanced receiver should provide better performance, as it has a low CMRR. The low CMRR can lead to the elimination of most signal-signal interference. Depending on the output power range of the LO laser 112, an optical amplifier 115 can be included in the receiver 111 to boost the power level of the LO 112. As illustrated in FIG. 4, each transponder $109_1$-$109_n$ can further include a digitizer 110 and a transmitter 119. The digitizer 110 can be configured to digitize the converted dropped signals received from the photodetectors 114 for transmission to corresponding users or clients. In turn, the transmitter 119 can transmit signals from users or clients to which the dropped signals were transmitted and can provide the user-signals to a coupler 120 for transmission to a splitter 121. The splitter 121 provides the signals to the ROADMs in the system 11.

Figure 5:
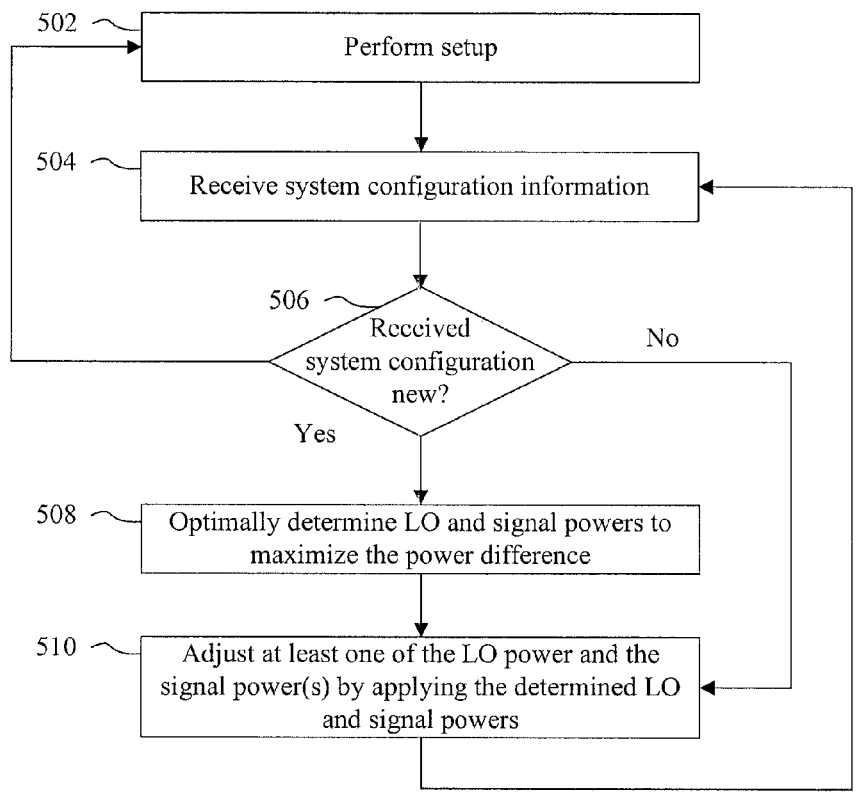
FIG. 5 is a high-level flow diagram of an exemplary method for optimizing power levels of a coherent receiver.

With reference now to FIG. 5, with continuing reference to FIGS. 3 and 4, an exemplary method 500 for optimizing the power levels of a coherent receiver 111 in an optical signal processing system 10 is illustrated. In particular, the method 500 implements the optimization by incorporating the three criteria described above to ensure that system 100 operates within any particular OSNR specifications. In accordance with one particular embodiment, the system 100 can include a processor 116 that is configured to perforin the optimization method 500 and thereby control the power levels within the system 100. It should be noted that all features described above can be utilized within the method 500.

Figure 6:
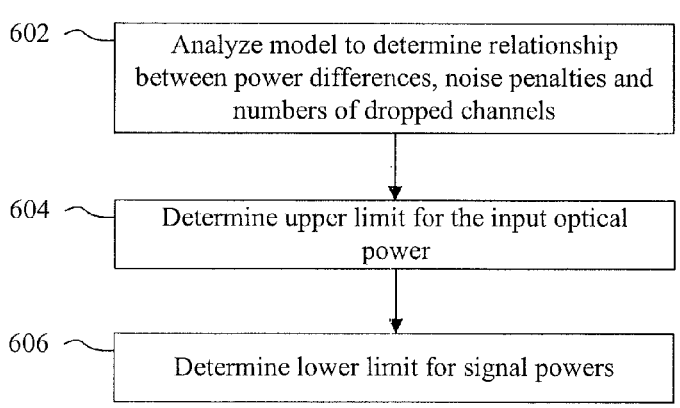
FIG. 6 is a high-level flow diagram of an exemplary set-up method for determining optimization parameters.

The method 500 can begin at step 502, in which the processor 116 can perform a setup. FIG. 6 illustrates an exemplary method for implementing step 502. Here, at step 602, the processor 116 can analyze a system model to determine the relationship between noise penalties, total numbers of dropped channels applied to a coherent receiver and power differences $\Delta P$ between the LO and one or more dropped signals. For example, the processor 116 can apply the above-referenced equations to generate information provided in the plots of FIGS. 1 and 2 for a plurality of power differences $\Delta P$. The number of power differences $\Delta P$ that the processor 116 evaluates can be dependent on the processing power of the processor 116 and can be selected to ensure that the response time of the processor meets system specifications. To determine the relationship between power differences $\Delta P$, the total number of dropped channels and the OSNR penalty, the processor 116 can employ receiver characteristics, such as a CMRR, and digitizer characteristics, such as ENOB figures. During the design and manufacturing of the system 100, the characteristics of each coherent receiver and digitizer can be estimated or measured. Information describing such characteristics can be stored in a storage medium (not shown) at the ROADM node 11. The processor 116 can retrieve this information from the storage medium to implement the optimization computations of the method 500. Alternatively, the processor 116 can be configured to systematically measure the receiver characteristics, such as the CMRR and signal power loss at the receiver, and digitizer characteristics to update the stored system information.

At step 604, the processor 116 can determine an upper power limit for the input optical power. As noted above, the input optical power is the sum of LO power and the signal powers, minus any loss at the receiver 111. In other words, the input optical power can correspond to the power of the signals input to the photodetectors 114. Further, as also noted above, the photodetectors 114 generally have an input power limit corresponding to a saturation power level that would saturate the PDs and would induce errors in the conversion output or damage the PDs themselves. Accordingly, the upper limit determined by the processor here can be the saturation power level of the particular PDs employed in the system 100. The saturation power level can be stored with the receiver characteristics described above with respect to step 602 or can be measured directly by the processor 116.

At step 606, the processor 116 can determine a lower power limit for one or more dropped signals output by the receiver 111. For example, as noted above, a low signal power can result in shot and thermal noise as well as quantization noise of the digitizer 110. Here, the shot and thermal noise can be pre-measured during the manufacturing of the system 100 for a variety of signal power levels, which in turn can be interpolated. The maximum, acceptable levels of shot and thermal noise can be predetermined based on system specifications. The corresponding signal power levels for the acceptable shot and thermal noise levels can be stored with the other receiver characteristics in the storage medium mentioned above with respect to step 602. Alternatively, the processor 116 can sweep through the variety of signal power levels by controlling the amplifier 106 and/or the VOA 107 to determine the shot and thermal noise associated with each signal power level at step 606. The processor 116 can thereafter reference the maximum, acceptable shot and thermal noise levels that are pre-stored in the storage medium to determine the signal power levels associated therewith. Furthermore, the processor 116 can reference digitizer characteristics, such as its frequency response, dynamic range and ENOB figures, that are pre-stored in the storage medium to estimate the effects of the power levels on quantization noise. Similar to the consideration of the shot and thermal noise, the maximum, acceptable levels quantization noise can be predetermined based upon system specifications and the processor 116 can compute the corresponding power levels for the acceptable quantization noise based on the estimate. Accordingly, the processor 116 can select the lowest of the power levels associated with the maximum, acceptable shot noise level, thermal noise level and quantization noise level as the lower power limit.

At step 504 of the method 500, the processor 116 can retrieve or receive system configuration information from various components of the system 100 and/or from the optical network on which the corresponding ROADM node 11 is located. For example, the system configuration information can include signal information, such as the total number of WDM channels dropped locally to the receiver 111 and the input signal power levels for each WDM channel. The processor 116 can receive the drop channel count from the ROADM node 11 and from a management system of the optical network on which the ROADM node 11 is located. In addition, an optical performance monitor (OPM) or an optical channel monitor (OCM) at the WSS 101 output (or other points in the node) can provide the drop channel count as well as the signal power level for each dropped channel to the processor 116. The system configuration information can also include receiver characteristics and/or digitizer characteristics discussed above with respect to step 502. For example, the processor 116 can retrieve or receive the characteristics when one or more receiver and/or digitizer elements are replaced or are added to the system 100. For example, such characteristics of added elements can be input by a user or by the added elements themselves.

At step 506, the processor 116 can determine whether the system configuration information is new. For example, the processor 116 can determine whether the system configuration information received at step 504 has changed from the system configuration information received at a previous iteration of step 504. For example, if the receiver characteristics and/or digitizer characteristics have changed, then the method can optionally proceed to step 502, where the processor 116 can repeat the setup with the updated characteristics. Alternatively, if only the signal information has changed or is initially input, then the method can proceed to step 508, in which the processor 116 can optimally determine the LO and signal powers based on the system configuration information received at step 504. In particular, the processor 116 can optimally determine the LO and signal powers to maximize the power difference ΔP between the LO laser signal and at least one of the plurality of channels input to the mixer 113.

Figure 7:
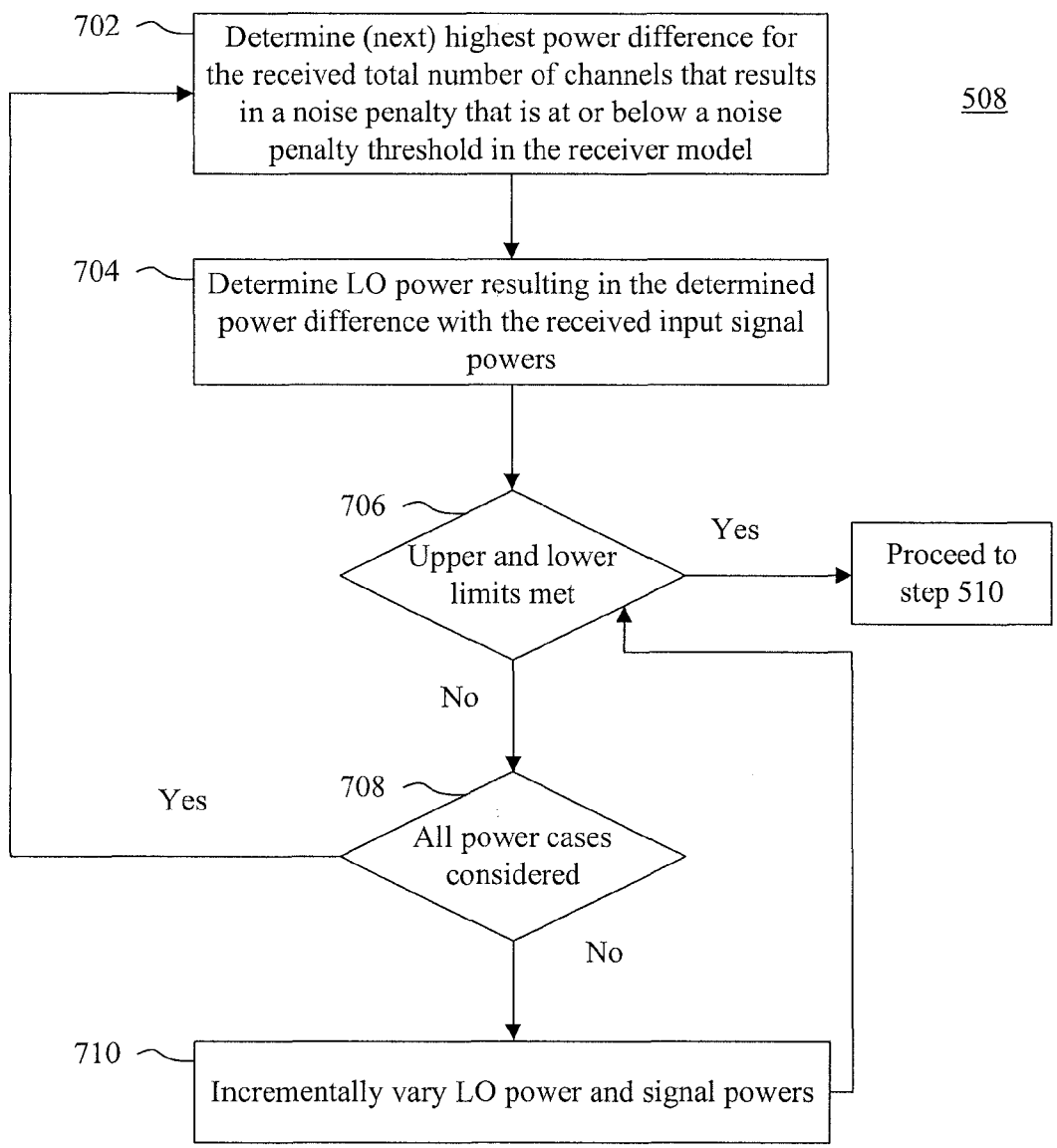
FIG. 7 is a high-level flow diagram of an exemplary method for determining the powers of a local oscillator laser and/or one or more dropped signals.

For example, FIG. 7 illustrates an exemplary method for implementing step 508. Here, at step 702, the processor 116 can determine a highest power difference ΔP for the total number of channels dropped locally to the receiver 111 that results in a noise penalty that is at or below a noise penalty threshold in the receiver model. Equivalently, the processor 116 can determine a highest power difference ΔP for the total number of channels dropped locally to the receiver 111 that results in an SNR or OSNR that is at or exceeds an SNR or OSNR threshold, respectively, in the receiver model. In this way, the processor 116 can constrain the power difference to ensure that the noise penalty is limited to the threshold level. For example, the processor 116 can determine the highest power difference ΔP by utilizing the relationship between noise penalties, total numbers of dropped channels applied to a coherent receiver and power differences ΔP between the LO and one or more dropped signals determined at step 602. Here, the processor 116 can assess each power difference ΔP evaluated at step 602 to determine which of the power differences result in a noise penalty that is at or below the OSNR penalty threshold for the particular total number of dropped channels received at step 504. Among these power differences, the processor 116 can select the highest power difference. For example, if the graph of FIG. 2 corresponds to the relationship determined at step 602 and the total number of locally dropped channels is "channel number limit 2," then the processor 116 can determine that power differences ΔP2, ΔP3 and ΔP4 are at or below the OSNR penalty threshold for the total number of locally dropped channels. In addition, the processor 116 would select ΔP4 as the highest power difference.

At step 704, the processor can determine the LO power resulting in the power difference determined at step 702. For example, the processor 116 can subtract from the determined (next) highest power difference the input signal power levels for each channel locally dropped to the receiver 111 received with the system configuration information at step 504.

At step 706, the processor 116 can determine whether the upper and lower limits are met. Here, the processor 116 can constrain the power level difference such that the power of the signals input to the photodetectors 114 are within the upper limit and such that the power of the signal output by the photodetectors 114 is within the lower limit. For example, the processor 116 can compare the input signal power levels for each channel locally dropped to the receiver 111 to the lower limit determined at step 606. In addition, the processor 116 can also compare the input optical power to the upper limit determined at step 604. As indicated above, the input optical power can be the power of signals provided to the PDs 114 and can be denoted by the sum of the LO power (determined at step 704) and the input signal power level(s), minus any internal loss at the receiver 111. The internal loss at the receiver can be determined or estimated from receiver characteristics, which can be stored in the storage medium as described above with respect to step 502. If the input signal power levels are below the lower limit and/or the input optical power is above the upper limit, then the method can proceed to step 708.

At step 708, the processor 116 can determine whether all cases or combinations of LO and signal power increments have been processed. If not, then the method can proceed to step 710.

At step 710, the processor 116 can incrementally vary the selection of LO power and/or the signal powers for evaluation purposes. For example, the processor 116 can be configured to consider a set of LO power increments and a set of signal power increments for the particular power difference determined at step 702. Here, in accordance with the method 508, the processor 116 can be configured to attempt each combination of LO and signal power increments while maintaining the power difference until the upper and lower limits are met or until all cases are evaluated. Thus, upon selection of an unevaluated combination of LO and signal power increments, the method can proceed to step 706 in which the comparison to the threshold limits can be repeated for another selected, unevaluated combination of LO and signal powers.

Returning to step 708, if all cases or combinations for the particular power difference have been processed, then the method can proceed to step 702. Here, at step 702, the processor 116 can determine the next highest power difference ΔP for the total number of channels dropped locally to the receiver 111 that is at or below a noise penalty threshold in the receiver model. Continuing with the example described above with respect to step 702, the processor can select ΔP3 as the next highest power difference ΔP. Thereafter, the method can repeat.

Returning to step 706, if the evaluated signal power levels and the input optical power meet the lower and upper limits, respectively, then the processor can select the evaluated signal and LO power levels as the optimized operation conditions and the method can proceed to step 510. It should be noted that the selected signal and LO power levels can correspond to the power of signals at lines 117 and 118, respectively, in the system 100.

At step 510, the processor 116 can adjust the LO power and/or one or more of the signal powers by applying the optimized operation conditions, including the determined or optimal LO and signal powers, to the system 100. For example, the processor 116 can adjust the settings of the amplifier 106 and/or the optional VOA 107 to reach the optimal signal power at line 117. In turn, the processor 116 can adjust the settings of the laser 112 and/or the LO amplifier 115 to reach the optimal LO power at line 118. Thereafter, the method may proceed to step 504 and can be repeated using any updates to the system configuration. The system 100 can be configured as a feedforward loop and does not require feedback iterations. Thus, the response is relatively fast. When the signal condition changes, for example when the number of channels input to the coherent receiver varies, the processor can respond immediately and dynamically by implementing an iteration of the method 500 using the updated information to achieve real time optimization.

It should be noted that, in most cases, the WSS 101 can provide a per-channel power equalization function to balance all dropped signals at line 103. If the power equalization function is not performed, the system 100 can include an additional VOA between the splitter 108 and each coherent mixer 113 to individually adjust the signal power level, as the amplifier 106 and the VOA 107 are used in the above-described embodiment to perform simultaneous power adjustment for all dropped channels.

It should also be noted that although the present principles have been described with respect to a colorless and directionless multi-degree filter-less ROADM, the present principles can also be applied in other WDM optical receivers, such as receivers at the destination node of a WDM transmission link.

Having described preferred embodiments of a system and method for power optimization of optical receivers (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. An optical receiver system comprising:
a local oscillator configured to generate a laser signal to indicate a selection of one of a plurality of channels;
a mixer configured to receive signals on the plurality of channels and to utilize the laser signal to distinguish the signal on the selected channel; and
a processor configured to maximize a power level difference between the laser signal and at least one of the plurality of channels based on a total number of the plurality of channels by adjusting the power of the laser signal input to the mixer to limit a noise penalty in the receiver system.

2. The system of claim 1, wherein the processor is further configured to determine a relationship between the power level difference and the noise penalty and to constrain the power level difference such that the noise penalty is limited to a threshold level.

3. The system of claim 1, further comprising:
photodetectors configured to receive and convert the distinguished signal to an electrical signal.

4. The system of claim 3, wherein the processor is further configured to constrain the power level difference such that the power of the distinguished signal is within an upper limit.

5. The system of claim 4, wherein the upper limit is based on a saturation limit of the photodetectors.

6. The system of claim 3, wherein the processor is further configured to constrain the power level difference such that the power of the converted signal is within a lower limit.

7. The system of claim 6, wherein the lower limit is based on at least one of shot noise, thermal noise and quantization noise.

8. The system of claim 1, wherein the processor is further configured to maximize the power level difference by adjusting power levels of signals on at least one of the plurality channels input to the mixer.

9. The system of claim 8, wherein the processor is further configured to dynamically maximize the power level difference in real time based upon changes in the total number of the plurality of channels on which signals are input to the mixer.

10. An optical signal processing system comprising:
a reconfigurable optical add/drop multiplexer (ROADM) node including a selective switch configured to select a set of channels from a plurality of channels to drop to a plurality of transponders; and
the plurality of transponders, wherein each transponder includes
a local oscillator configured to generate a laser signal to indicate a selection of one of a plurality of channels and
a mixer configured to receive signals on the set of channels and to utilize the laser signal to distinguish the signal on the selected channel,
wherein the ROADM node further includes a processor configured to maximize a power level difference between the laser signal and at least one of the channels in the set of channels based on a total number of the set of channels by adjusting the power of the laser signal input to the mixer to limit a noise penalty in the corresponding transponder.

11. The system of claim 10, wherein the processor is further configured to determine a relationship between the power level difference and the noise penalty and to constrain the power level difference such that the noise penalty is limited to a threshold level.

12. The system of claim 10, wherein the processor is further configured to dynamically maximize the power level difference in real time based upon changes in the total number of the set of channels on which signals are input to the mixer.

13. A method for optimizing optical signal power comprising:
   receiving a total number of a plurality of channels on which signals are input into an optical mixer;
   determining a maximal power level difference between a laser signal, generated to enable the mixer to distinguish a signal on one of the plurality of channels, and at least one of the plurality of channels based on the total number of the plurality of channels; and
   adjusting the power of the laser signal input to the mixer in accordance with the determined maximal power level difference to limit a noise penalty.

14. The method of claim 13, wherein the determining further comprises determining a relationship between the power level difference and the noise penalty and constraining the power level difference such that the noise penalty is limited to a threshold level.

15. The method of claim 13, wherein the determining further comprises constraining the power level difference such that the power of the distinguished signal is within an upper limit.

16. The method of claim 15, wherein the upper limit is based on a saturation limit of photodetectors configured to convert the distinguished signal to an electrical signal.

17. The method of claim 16, wherein the determining further comprises constraining the power level difference such that the power of the converted signal is within a lower limit.

18. The method of claim 17, wherein the lower limit is based on at least one of shot noise, thermal noise and quantization noise.

19. The method of claim 13, wherein the adjusting further comprises adjusting the power levels of signals on at least one of the plurality channels input to the mixer.

20. The method of claim 13, further comprising:
   iterating the receiving, determining and adjusting to dynamically maximize the power level difference in real time based upon changes in the total number of the plurality of channels on which signals are input to the mixer.

* * * * *